(12) United States Patent
Simard et al.

(10) Patent No.: US 7,512,274 B2
(45) Date of Patent: *Mar. 31, 2009

(54) BLOCK RETOUCHING

(75) Inventors: Patrice Y. Simard, Bellevue, WA (US); Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 323 days.

This patent is subject to a terminal disclaimer.

(21) Appl. No.: 11/393,297

(22) Filed: Mar. 30, 2006

(65) Prior Publication Data

US 2006/0171604 A1    Aug. 3, 2006

Related U.S. Application Data

(63) Continuation of application No. 10/180,649, filed on Jun. 26, 2002, now Pat. No. 7,024,039, which is a continuation-in-part of application No. 10/133,842, filed on Apr. 25, 2002, now Pat. No. 7,263,227, and a continuation-in-part of application No. 10/133,558, filed on Apr. 25, 2002, now Pat. No. 7,164,797, and a continuation-in-part of application No. 10/133,939, filed on Apr. 25, 2002, now Pat. No. 7,392,472.

(51) Int. Cl.
    *G06K 9/46*    (2006.01)
(52) U.S. Cl. ...................... 382/195; 382/264; 348/586; 358/448

(58) Field of Classification Search ................ 382/195, 382/232, 166, 269, 236, 173, 233, 164, 240, 382/266, 284, 154, 264; 345/629, 419, 634, 345/611, 428; 348/586, 587, 592, 590, 597, 348/E5.052, 699, E5.059, E5.058, E9.056, 348/578; 358/464, 448, 450; 375/E7.081, 375/E7.04, E7.166, E7.112, E7.182, E7.088, 375/E7.19, E7.226

See application file for complete search history.

(56) References Cited

U.S. PATENT DOCUMENTS 3,606,546 A    9/1971    Dudley
3,719,922 A    3/1973    Lopes, Jr. et al.

(Continued)

FOREIGN PATENT DOCUMENTS

EP    0567344 A2    10/1993

(Continued)

OTHER PUBLICATIONS

Kazuaki Nakamura, "Document Image Segmentation Using Neural Networks, The Journal of the Institute of Image Electronics Engineers of Japan", Japan, Institute of Image Electronics Engineers, Apr. 25, 1999, vol. 28, No. 2, pp. 106 to 115.

(Continued)

*Primary Examiner*—Sheela C Chawan
(74) *Attorney, Agent, or Firm*—Amin, Turocy & Calvin, LLP

(57) ABSTRACT

A system and method facilitating image retouching is provided. The invention includes an image retoucher having a boundary detector and an image extender. The invention provides for the image retoucher to extend care pixels of at least one of a foreground and a background near a detected spurious boundary by altering the binary mask used for compression of the foreground and/or the background.

20 Claims, 10 Drawing Sheets

U.S. PATENT DOCUMENTS

| | | | |
|---|---|---|---|
| 3,882,454 A | 5/1975 | Marie et al. | |
| 4,606,069 A | 8/1986 | Johnson et al. | |
| 4,747,156 A | 5/1988 | Wahl | |
| 4,754,492 A | 6/1988 | Malvar | |
| 4,922,545 A | 5/1990 | Endoh et al. | |
| 4,924,494 A | 5/1990 | Shung | |
| 5,077,807 A | 12/1991 | Bokser | |
| 5,129,014 A | 7/1992 | Bloomberg | |
| 5,304,991 A | 4/1994 | Motegi | |
| 5,402,146 A | 3/1995 | Rodriguez et al. | |
| 5,434,953 A | 7/1995 | Bloomberg | |
| 5,454,047 A | 9/1995 | Chang et al. | |
| 5,572,565 A | 11/1996 | Abdel-Mottaleb | |
| 5,572,604 A | 11/1996 | Simard | |
| 5,592,568 A | 1/1997 | Wilcox et al. | |
| 5,610,996 A | 3/1997 | Eller | |
| 5,689,585 A | 11/1997 | Bloomberg et al. | |
| 5,737,455 A | 4/1998 | Harrington et al. | |
| 5,754,183 A | 5/1998 | Berend et al. | |
| 5,778,092 A | 7/1998 | MacLeod et al. | |
| 5,790,696 A | 8/1998 | Takahashi | |
| 5,805,727 A | 9/1998 | Nakano | |
| 5,805,739 A | 9/1998 | Malvar et al. | |
| 5,828,771 A | 10/1998 | Bloomberg | |
| 5,883,986 A | 3/1999 | Kopec et al. | |
| 5,910,805 A | 6/1999 | Hickey et al. | |
| 5,914,748 A | 6/1999 | Parulski et al. | |
| 5,915,044 A | 6/1999 | Gardos et al. | |
| 5,917,951 A | 6/1999 | Thompson et al. | |
| 5,917,964 A | 6/1999 | Normile | |
| 5,923,380 A | 7/1999 | Yang et al. | |
| 5,930,377 A | 7/1999 | Powell et al. | |
| 5,960,111 A | 9/1999 | Chen et al. | |
| 5,960,119 A | 9/1999 | Echigo et al. | |
| 5,991,515 A | 11/1999 | Fall et al. | |
| 6,000,124 A | 12/1999 | Saito et al. | |
| 6,020,972 A | 2/2000 | Mahoney et al. | |
| 6,029,126 A | 2/2000 | Malvar | |
| 6,058,362 A | 5/2000 | Malvar | |
| 6,064,762 A | 5/2000 | Haenel | |
| 6,069,636 A | 5/2000 | Sayuda et al. | |
| 6,072,496 A | 6/2000 | Guenter et al. | |
| 6,073,153 A | 6/2000 | Malvar | |
| 6,094,506 A | 7/2000 | Hullender | |
| 6,100,825 A | 8/2000 | Sedluk et al. | |
| 6,108,444 A | 8/2000 | Syeda-Mahmood | |
| 6,108,446 A | 8/2000 | Hoshen | |
| 6,115,689 A | 9/2000 | Malvar | |
| 6,118,890 A | 9/2000 | Senior | |
| 6,137,908 A | 10/2000 | Rhee | |
| 6,144,767 A | 11/2000 | Bottou et al. | |
| 6,151,424 A | 11/2000 | Hsu | |
| 6,154,762 A | 11/2000 | Malvar | |
| 6,182,034 B1 | 1/2001 | Malvar | |
| 6,192,360 B1 | 2/2001 | Dumais et al. | |
| 6,233,364 B1 | 5/2001 | Krainiouk et al. | |
| 6,240,380 B1 | 5/2001 | Malvar | |
| 6,253,165 B1 | 6/2001 | Malvar | |
| 6,256,608 B1 | 7/2001 | Malvar | |
| 6,272,253 B1 | 8/2001 | Bannon et al. | |
| 6,285,801 B1 | 9/2001 | Mancuso et al. | |
| 6,295,371 B1 | 9/2001 | Rucklidge et al. | |
| 6,309,424 B1 | 10/2001 | Fallon | |
| 6,310,972 B1 | 10/2001 | Li et al. | |
| 6,321,243 B1 | 11/2001 | Ballard | |
| 6,324,560 B1 | 11/2001 | Malvar | |
| 6,326,977 B1 | 12/2001 | Westerman | |
| 6,334,001 B2 | 12/2001 | de Queiroz et al. | |
| 6,345,119 B1 | 2/2002 | Hotta et al. | |
| 6,411,733 B1 | 6/2002 | Saund | |
| 6,564,263 B1 | 5/2003 | Bergman et al. | |
| 6,633,670 B1 | 10/2003 | Matthews | |
| 6,658,151 B2 | 12/2003 | Lee et al. | |
| 6,731,800 B1 | 5/2004 | Barthel et al. | |
| 6,735,335 B1 | 5/2004 | Liu et al. | |
| 6,738,079 B1 | 5/2004 | Kellerman et al. | |
| 6,819,796 B2 | 11/2004 | Hong et al. | |
| 6,826,727 B1 | 11/2004 | Mohr et al. | |
| 6,901,153 B1 | 5/2005 | Leone | |
| 6,907,141 B1 | 6/2005 | Okamoto | |
| 6,941,014 B2 | 9/2005 | Lin et al. | |
| 6,977,664 B1 | 12/2005 | Jinzenji et al. | |
| 7,024,039 B2 * | 4/2006 | Simard et al. | 382/195 |
| 7,039,232 B2 | 5/2006 | Nagarajan et al. | |
| 2001/0004618 A1 | 6/2001 | Hur | |
| 2002/0064313 A1 | 5/2002 | Cheng | |
| 2003/0123729 A1 | 7/2003 | Mukherjee et al. | |
| 2003/0133615 A1 | 7/2003 | Bern et al. | |
| 2003/0198386 A1 | 10/2003 | Luo | |
| 2003/0229856 A1 | 12/2003 | Lynn et al. | |

FOREIGN PATENT DOCUMENTS

| | | |
|---|---|---|
| EP | 0621554 A2 | 10/1994 |
| EP | 0802680 | 10/1997 |
| EP | 0853421 | 7/1998 |
| EP | 1006714 A2 | 6/2000 |
| EP | 1104916 | 6/2001 |
| EP | 1006714 A3 | 9/2001 |
| EP | 1146478 A2 | 10/2001 |
| GB | 2181875 | 4/1987 |
| GB | 2230633 A | 10/1990 |
| JP | 60254871 | 12/1985 |
| JP | 63269267 | 11/1988 |
| JP | 2277183 | 11/1990 |
| JP | 03018986 | 1/1991 |
| JP | 04264687 | 9/1992 |
| JP | 668301 | 3/1994 |
| JP | 06231307 | 8/1994 |
| JP | 08101893 | 4/1996 |
| JP | 10262155 | 9/1998 |
| JP | 2000013596 | 1/2000 |
| JP | 2001266158 | 9/2001 |
| JP | 2002118843 | 4/2002 |

OTHER PUBLICATIONS

Debargha Mukherjee, et al., "JPEG2000-Matched MRC Compression of Compound Documents", Jun. 6, 2002.

Rangachar Kasturi, et al., "Document Image Analysis: A Primer", Sadhana vol. 27, Part 1, Feb. 2002, pp. 3-22.

Qian Huang, et al., "Foreground/Background Segmentation of Color Images by Integration of Multiple Cues", Proceedings of '95 Int'l. Conf. on Image Processing (ICIP).

Guotong Feng, et al., "High Quality MRC Document Coding", School of Electrical and Computer Engineering, Purdue University, Sarnoff Corporation.

Ping Wah Wong, "Halftoning by Multiscale Dot Distribution", Proceedings of the '95 Int'l. Conf. on Image Processing (ICIP '95), pp. 117-120.

Yann Lecun, et al., "Learning Algorithms for Classification: A Comparison on Handwritten Digit Recognition", AT&T Bell Laboratories.

Patrice Y. Simard, et al. "Boxlets: A Fast Convolution Algorithm for Signal Processing and Neural Networks", AT&T Labs-Research.

Trevor Hastie, et al., "Metrics and Models for Handwritten Character Recognition", Dec. 8, 1997: pp. 1-18.

Leon Bottou, et al., "High Quality Document Image Compression wiht DjVu", Jul. 13, 1998, AT&T Labs.

Patrick Haffner, et al., "Color Documents on the Web with DjVu", AT&T Labs- Research.

Yiu-Fai Wong, et al., "Preprocessing of Video Signals for MPEG Coding by Clustering Filter", Proceedings of the '95 Int'l. Conf. on Image Processing (ICIP '95), pp. 129-132.

Patrick Haffner, et al., "DjVu: Analyzing and Compressing Scanned Documents for Internet Distribution", AT&T Labs-Research, pp. 1-4.

Felix Balado Pumarino, et al., "A Two-Stage Codebook Building Method Using Fast WAN", University of Vigo, Communications Technology Department.

Henrique S. Malvar, "Fat Progressive Wavelet Coding", Microsoft Research.

Patrice Y. Simard, et al., "A Wavelet Coder for Masked Images", Proceedings of the Data Compression Conference (DCC '01), Microsoft Research.

Queiroz, et al., "Optimizing Block-Threseholding Segmentation for Multilayer Compression of Compound Images" (Sep. 9, 2000) IEEE Transactions on Image Processing, IEEE Inc. New York, pp. 1461-1471.

Salembier, et al., "Region-Based Representations of Image and Video: Segmentation Tools for Multimedia Services" (Dec. 8, 1999) IEEE Transactions on Circuits and Systems for Video Technology, IEEE Inc. New York, pp. 1147-1169.

Haffner, et al., "Browsing through high quality document images with DjVu" Research and Technology Advances in Digital Libraries. ADL 1998 Proceedings (Apr. 22, 1998) IEEE International Forum in Santa Barbara, California, pp. 309-318.

Simard, et al., "A Wavelet Coder for Masked Images" Proceedings of IEE Data Compression Conference (Mar. 27, 2001) Snowbird, Utah, pp. 93-102.

Simard, et al., "A Foreground/Background Separation Algorith for Image Compression" (Mar. 23, 2004) Data Compression Conference, Snowbird, Utah, pp. 498-507.

European Search Report dated Oct. 4, 2005 mailed Oct. 13, 2005 for PCT U.S. Appl. No. 10/180,169, 5 pages.

European Search Report dated Sep. 15, 2005 mailed Sep. 30, 2005, for European Patent Application Serial No. EP 03 00 5429, 4 pages.

Witten, Ian H., et al., "Textual Image Compression", Data Compression Conference, IEEE, 10 pages, Mar. 24, 1992.

European Search Report dated Nov. 21, 2005, mailed Nov. 30, 2005, for European Patent Application Serial No. EP 03 00 6769, 3 pages.

European Search Report dated Oct. 4, 2005 mailed Oct. 13, 2005 for EP Application Serial No. 103005430, 5 pages.

Mukherjee, et al., "LPEG-Matched MRC Compression of Compound Documents" Proceedings 2001 International Conference on Image Processing (Oct. 7-10, 2001) Thessalonki, Greece, pp. 434-437.

Cosman, et al., "Memory Efficient Quadtree Wavelet Coding for Compound Images" Conference Record of the Thirty-Third Asilomar Conference (Oct. 24-27, 1999) Piscataway, New Jersey, pp. 1173-1177.

European Search Report dated Oct. 4, 2005 mailed Oct. 13, 2005 for EP Application Serial No. 03/005,431, 5 pages.

U.S. Appl. No. 10/180,800, filed Jun. 26, 2002, Malvar et al.
U.S. Appl. No. 10/133,939, filed Apr. 25, 2002, Simard et al.
U.S. Appl. No. 10/133,558, filed Apr. 25, 2002, Simard et al.
U.S. Appl. No. 10/180,169, filed Jun. 26, 2002, Simard et al.
U.S. Appl. No. 10/180,771, filed Jun. 26, 2002, Simard et al.
U.S. Appl. No. 11/286,622, filed Nov. 23, 2005, Malvar et al.
U.S. Appl. No. 10/133,842, filed Apr. 25, 2002, Simard et al.
U.S. Appl. No. 11/198,562, filed Aug. 5, 2005, Simard et al.

* cited by examiner

ORIGINAL

MERGED REGION

BINARY MASK   FIG. 4

BLOCK RETOUCHING

CROSS-REFERENCE TO RELATED APPLICATIONS

This application is a Continuation of U.S. patent application Ser. No. 10/180,649, filed Jun. 26, 2002, entitled "BLOCK RETOUCHING", which is a Continuation-in-Part of U.S. patent application Ser. No. 10/133,842, filed Apr. 25, 2002, entitled, "ACTIVITY DETECTOR", U.S. patent application Ser. No. 10/133,558, filed Apr. 25, 2002, entitled, "CLUSTERING", and U.S. patent application Ser. No. 10/133,939, filed Apr. 25, 2002, entitled, "LAYOUT ANALYSIS". The entireties of the aforementioned applications are incorporated herein by reference. This application is also related to U.S. patent application Ser. No. 10/180,800, filed Jun. 26, 2002, entitled "DON'T CARE" PIXEL INTERPOLATION", U.S. patent application Ser. No. 11/286,622, filed Nov. 23, 2005, entitled, "LAYOUT ANALYSIS", U.S. patent application Ser. No. 11/198,562, filed Aug. 5, 2005, entitled, "CLUSTERING", U.S. patent application Ser. No. 10/180,169, filed Jun. 26, 2002, entitled, "SEGMENTED LAYERED IMAGE SYSTEM", U.S. patent application Ser. No. 10/180,169, filed Jun. 26, 2002, entitled, "SEGMENTED LAYERED IMAGE SYSTEM", U.S. patent application Ser. No. 10/180,771, filed Jun. 26, 2002, entitled, "SYSTEM AND METHOD FACILITATING DOCUMENT IMAGE COMPRESSION UTILIZING A MASK", and U.S. patent application Ser. No. 10/180,771, filed Jun. 26, 2002, entitled, "SYSTEM AND METHOD FACILITATING DOCUMENT IMAGE COMPRESSION UTILIZING A MASK".

TECHNICAL FIELD

The present invention relates generally to document image processing, and more particularly to a system and method facilitating image retouching.

BACKGROUND OF THE INVENTION

The amount of information available via computers has dramatically increased with the wide spread proliferation of computer networks, the Internet and digital storage means. With such increased amount of information has come the need to transmit information quickly and to store the information efficiently. Data compression is a technology that facilitates effectively transmitting and storing of information Data compression reduces an amount of space necessary to represent information, and can be used for many information types. The demand for compression of digital information, including images, text, audio and video has been ever increasing. Typically, data compression is used with standard computer systems; however, other technologies make use of data compression, such as but not limited to digital and satellite television as well as cellular/digital phones.

As the demand for handling, transmitting and processing large amounts of information increases, the demand for compression of such data increases as well. Although storage device capacity has increased significantly, the demand for information has outpaced capacity advancements. For example, an uncompressed image can require 5 megabytes of space whereas the same image can be compressed and require only 2.5 megabytes of space. Thus, data compression facilitates transferring larger amounts of information. Even with the increase of transmission rates, such as broadband, DSL, cable modem Internet and the like, transmission limits are easily reached with uncompressed information. For example, transmission of an uncompressed image over a DSL line can take ten minutes. However, the same image can be transmitted in about one minute when compressed thus providing a ten-fold gain in data throughput.

In general, there are two types of compression, lossless and lossy. Lossless compression allows exact original data to be recovered after compression, while lossy compression allows for data recovered after compression to differ from the original data. A tradeoff exists between the two compression modes in that lossy compression provides for a better compression ratio than lossless compression because some degree of data integrity compromise is tolerated. Lossless compression may be used, for example, when compressing critical text, because failure to reconstruct exactly the data can dramatically affect quality and readability of the text. Lossy compression can be used with images or non-critical text where a certain amount of distortion or noise is either acceptable or imperceptible to human senses. Data compression is especially applicable to digital representations of documents (digital documents). Typically, digital documents include text, images and/or text and images. In addition to using less storage space for current digital data, compact storage without significant degradation of quality would encourage digitization of current hardcopies of documents making paperless offices more feasible. Striving toward such paperless offices is a goal for many businesses because paperless offices provide benefits, such as allowing easy access to information, reducing environmental costs, reducing storage costs and the like. Furthermore, decreasing file sizes of digital documents through compression permits more efficient use of Internet bandwidth, thus allowing for faster transmission of more information and a reduction of network congestion. Reducing required storage for information, movement toward efficient paperless offices, and increasing Internet bandwidth efficiency are just some of many significant benefits associated with compression technology.

Compression of digital documents should satisfy certain goals in order to make use of digital documents more attractive. First, the compression should enable compressing and decompressing large amounts of information in a small amount of time. Secondly, the compression should provide for accurately reproducing the digital document. Additionally, data compression of digital documents should make use of an intended purpose or ultimate use of a document. Some digital documents are employed for filing or providing hard copies. Other documents may be revised and/or edited. Many conventional data compression methodologies fail to handle re-flowing of text and/or images when viewed, and fail to provide efficient and effective means to enable compression technology to recognized characters and re-flow them to word processors, personal digital assistants (PDAs), cellular phones, and the like. Therefore, if hard copy office documents are scanned into digital form, current compression technology can make it difficult if not impossible to update, amend, or in general change the digitized document.

Typically, data compression systems have used data encoders that quantize data in order to effect compression. Quantization necessarily involves the loss of some information. Data compression systems that utilize blocks, for example, JPEG, can cause observable artifact(s) due to quantization when, for example, a blocking boundary occurs within a generally smooth area. These blocking artifacts are particularly distracting because the human eye is very good at detecting edges. It is therefore advantageous to make some compromises in compression, in order to decrease blocking artifacts.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for an image retoucher that receives an image input (e.g., based on a document to be archived and/or transmitted) and retouches the image to facilitate compression there of. For the purpose of compression, a color image can be advantageously decomposed into a foreground, a background and a mask which indicates for each pixel whether it belongs to the foreground or the background. Such decomposition benefits from the fact that sharp lines such as text and graphic lines are typically captured in the mask where they can be compressed effectively using a FAX-like compression algorithm. The foreground and background each contain "don't care" pixels, since if a pixel is encoded in the foreground, it doesn't need to be encoded in the background and vice versa. The "don't care" pixel values can be chosen to maximize compression when the whole foreground and the background are encoded (e.g., using traditional compression algorithms such as JPEG). Typically, the "don't care" values are chosen to create smooth foreground and background. For instance a red page with blue text would have a completely red background and a completely blue foreground, which would each compress to almost nothing. The text itself would be captured in the binary mask, and compressed very effectively as binary text. As a result, the combination of the compressed foreground, background and mask would be much smaller in size than if a JPEG like algorithm was applied to the original page. During reconstruction, the mask, foreground and background are decoded, and then the mask is used to select pixels from the foreground and the background to reconstruct the image.

Ideally, the binary mask captures text and important graphics line and objects, but since the mask is binary, important information may not be captured by the mask in a multi-color images. To insure that sharp color transitions are in the mask, a possible solution is to divide the image into block of various sizes, to insure that they are roughly only two colors in each block. The two colors are assigned respectively to the foreground and the background and are then captured by the mask. Such algorithms, however, introduce spurious mask transition or "spurious boundaries" between blocks. Once the document image has been compressed (e.g., by an encoder) and uncompressed (e.g., by a decoder), the artificial boundary can cause an observable artifact. This happens for instance when both the foreground and the background are compressed independently in lossy mode. The pixels on one side of the spurious boundary are quantized to some value in the foreground, while the pixels on the other side of the spurious boundary are quantized to another value in the background. When the image is reconstructed, using the mask to determine which pixels come from the foreground and which pixels come from the background, the value on each side of the spurious boundary do not match and create a visible edge, or blocking artifact.

The image retoucher can detect a spurious boundary in the document image based, at least in part, upon information stored in the binary mask. The image retoucher is further adapted to extend a foreground and/or background near the spurious boundary based, at least in part, by altering information stored in the binary mask. For instance, the pixels that were "don't care" near the spurious boundary in either the foreground and the background can become "do care" in both the foreground and the background. The result is that the quantization errors in the foreground and the background are based substantially on the same pixels and are therefore closer to each other near the spurious boundary. This greatly decreases the blocking artifacts. Note that image extender added some "do care" pixels to the foreground and the background image for the purpose of reducing compressing errors of these two images near spurious boundaries. The mask that is being encoded remains the same.

The image retoucher includes a boundary detector and an image extender. The boundary detector detects a spurious boundary in a document image comprising a foreground and a background. The boundary detector can utilize information stored in the binary mask in order to detect the spurious boundary. Detection can be performed by identifying horizontal and/or vertical line(s) of a merged region boundary that are longer than a first threshold quantity of pixel(s) (e.g., five pixels) for which: (1) one side of the boundary is foreground and the other side background, and (2) linear regression along that line on either side differs by more than a second threshold amount (e.g., linear regression can be performed on the boundary pixels of the foreground side of the pixels and linear regression performed for the pixels of the background side of the pixels). Instead of a linear regression, a constant regression (e.g., the average) can also be used.

Once a spurious boundary has been detected by the boundary detector, the image extender extends care pixels of the foreground on the side of the boundary line that is foreground and/or the background on the side of the boundary line that is background near the spurious boundary, for example, by alteration of the binary mask. By extending the care pixels of the foreground and the background, a quantization effect on both sides of the spurious boundary can be minimized thus significantly mitigating an observable effect of an artifact resulting from quantization. The extension near the spurious boundary can be computed by setting to "do care" substantially all the pixel within a (third) threshold distance (e.g. five pixel) of the spurious boundary.

Another aspect of the present invention provides for a segmented layered image system (e.g., facilitating identification and/or compression of text, handwriting, drawings and the like) having an image retoucher including a boundary detector and an image extender, the segmented layered image system further includes a mask separator—the mask separator receives a document image (e.g., based on a document to be archived and/or transmitted). The segmented layered image system can be part of a document compression system, for example. The mask separator component processes the document image and outputs a binary mask indicating whether each pixel of the document image belongs in the foreground and/or background. The binary mask can then be utilized by the image retoucher.

Another aspect of the present invention provides for the image retoucher to be employed in a vast array of document image applications, including, but not limited to, photocopiers, document scanners, optical character recognition systems, personal digital assistants, fax machines, digital cameras and/or digital video cameras.

Other aspects of the present invention provide methods for retouching an image and detecting a spurious boundary, a computer readable medium having computer usable instructions for an image retouching, a computer readable medium storing computer executable instructions operable to perform a method for retouching an image and a data packet adapted to be transmitted between two or more computer processes comprising information associated with a retouched mask, the retouched mask comprising at least one altered care pixel, alteration being based, at least in part, upon detection of a spurious boundary and extension of a care pixel in at least one of a foreground and a background near the spurious boundary by alteration of a binary mask for compression of the foreground and/or background.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
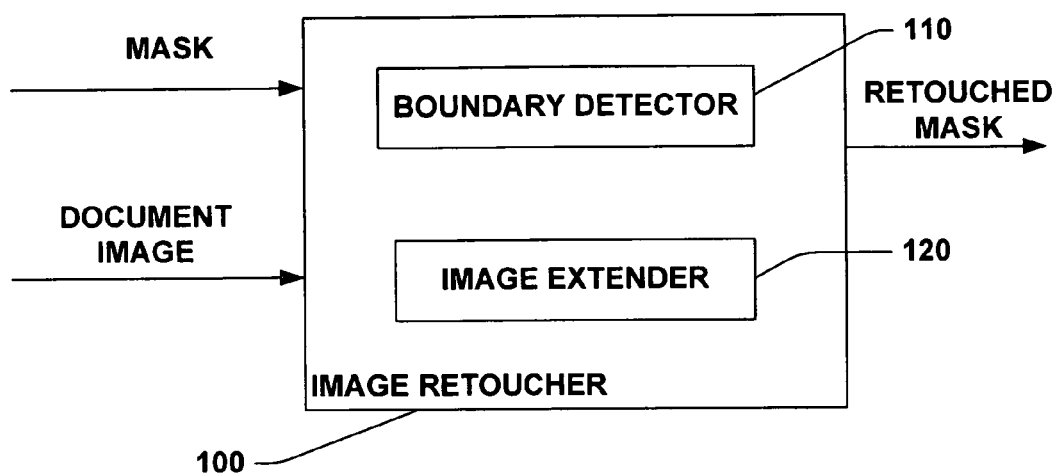
FIG. 1 is block diagram of an image retoucher in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Further, "document image" is intended to refer to a digital representation of document(s) comprising one or more color(s) (e.g., gray-scale and/or color document(s)). Additionally, a document image can have image(s), text and/or text with images. A document image can be binary, RGB and/or YUV representations of document(s). An RGB document image is represented by red, green and blue components. A YUV document image is represented using a luminescence component denoted by Y and chrominance components denoted by U and V. Less bits can be used to represent the chrominance components U and V without significantly sacrificing visual quality of the YUV image. The YUV representation is, generally, a more compact and easy to use representation than an RGB representation. A document image comprises picture elements commonly referred to as "pixels". A document image can be based on single or multi-page document(s) of any shape or size.

Referring to FIG. 1, an image retoucher 100 in accordance with an aspect of the present invention is illustrated. The image retoucher 100 includes a boundary detector 110 and an image extender 120. The image retoucher 100 receives an image input (e.g., based on a document to be archived and/or transmitted). For example, the image input can be a document image (e.g., a binary, RGB and/or YUV representation of document(s)). Additionally, the image retoucher 100 receives a binary mask indicating, for example, whether each pixel of the image input belongs in the foreground and/or background. The image retoucher 100 is adapted to detect a spurious boundary in the document image based, at least in part, upon information stored in the binary mask. Ideally, the binary mask captures text and important graphics line and objects, but since the mask is binary, important information may not be captured by the mask in a multi-color images. To insure that sharp color transitions are in the mask, a possible solution is to divide the image into block of various sizes, to insure that they are roughly only two colors in each block. The two colors are assigned respectively to the foreground and the background and are then captured by the mask. Such algorithms, however, introduce spurious mask transition or "spurious boundaries" between blocks. Once the document image has been compressed (e.g., by an encoder) and uncompressed (e.g., by a decoder), the artificial boundary can cause an observable artifact. This happens for instance when both the foreground and the background are compressed independently in lossy mode. The pixels on one side of the spurious boundary are quantized to some value in the foreground, while the pixels on the other side of the spurious boundary are quantized to another value in the background. When the image is reconstructed, using the mask to determine which pixels come from the foreground and which pixels come from the background, the value on each side of the spurious boundary do not match and create a visible edge, or blocking artifact.

The artifact can be result from quantization occurring within an encoder, for example. The image retoucher 100 is further adapted to extend the foreground and/or background near the spurious boundary based, at least in part, by altering information stored in the binary mask. By extending the foreground and/or background near the spurious boundary, the effect of the spurious boundary and the resultant artifact can be reduced. For instance, the pixels that were "don't care" near the spurious boundary in either the foreground and the background can become "do care" in both the foreground and the background. The result is that the quantization errors in the foreground and the background are based substantially on the same pixels and are therefore closer to each other near the spurious boundary. This greatly decreases the blocking artifacts. Note that image extender added some "do care" pixels to the foreground and the background image for the purpose of reducing compressing errors of these two images near spurious boundaries. The mask that is being encoded remains the same.

For example, the image retoucher 100 can be a component of a segmented layered image system (not shown). The image retoucher 100 can receive the binary mask from a mask separator component (not shown) that receives the document image as an input and outputs the binary mask (e.g., based, at least in part, upon minimization of pixel energy of at least one of the foreground and the background).

Figure 2:
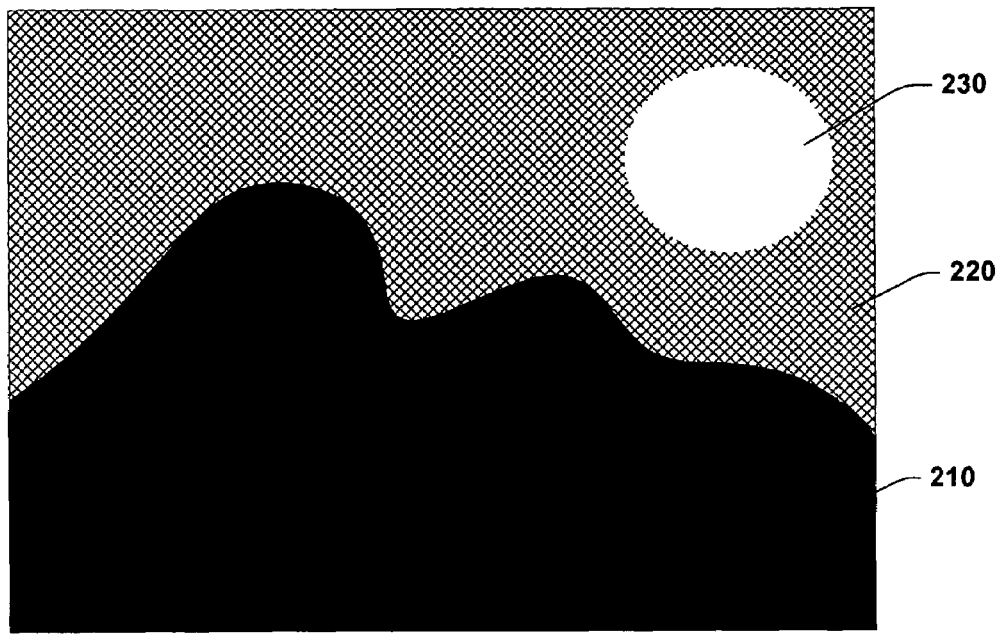
FIG. 2 is an exemplary document image in accordance with an aspect of the present invention.
Figure 3:
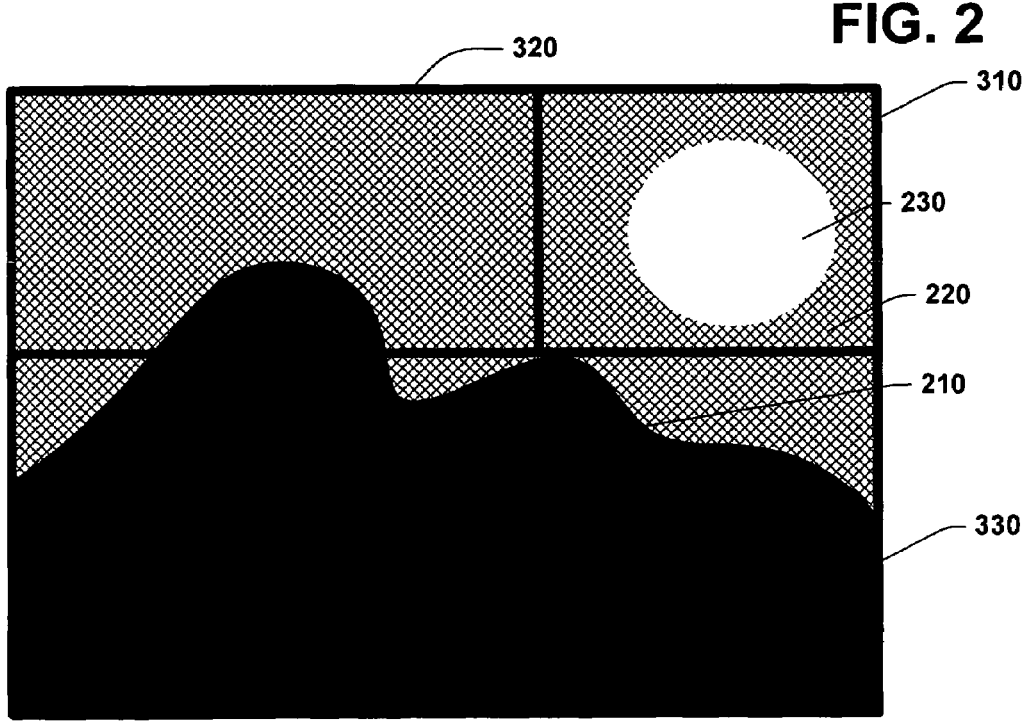
FIG. 3 depicts merged regions associated with the exemplary document image of FIG. 2 in accordance with an aspect of the present invention.
Figure 4:
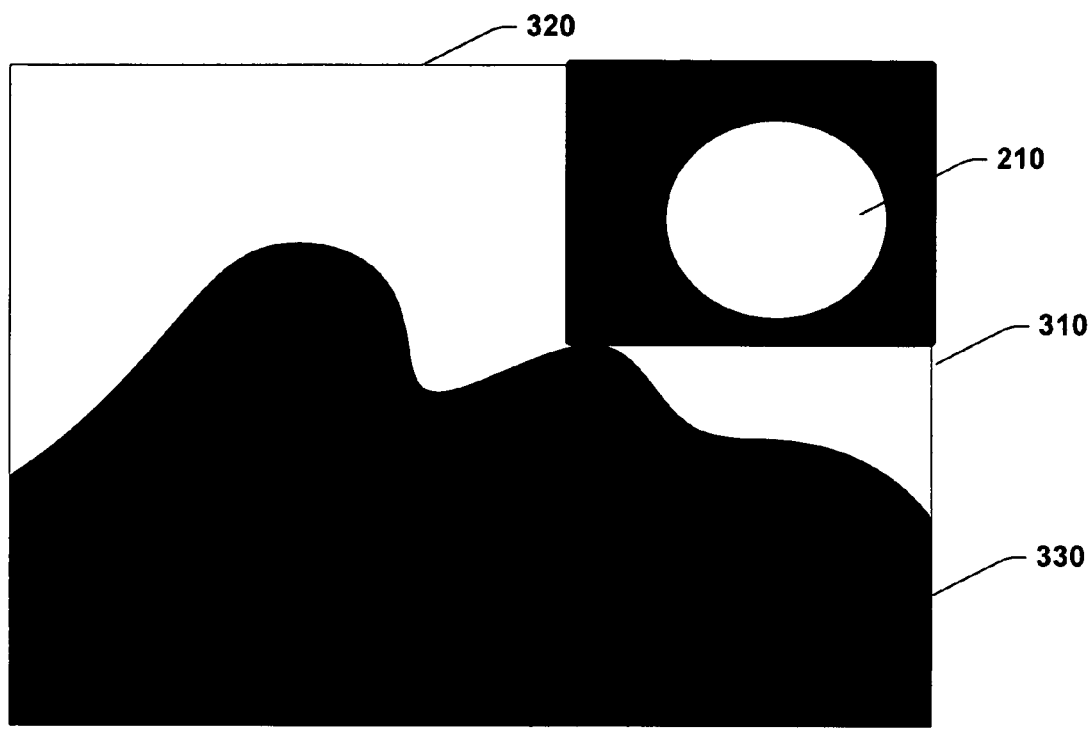
FIG. 4 depicts a binary mask associated with the exemplary document image of FIG. 2 and the merged regions of FIG. 3 in accordance with an aspect of the present invention.

Turning briefly to FIG. 2, an exemplary document image is illustrated. The document image comprises three elements, a first region 210 (e.g., dark color), a second region 220 (e.g., gray-hatched area) and a circular region 230 (e.g., light color). FIG. 3 illustrates a first merged region 310, a second merged region 320 and a third merged region 330 of the exemplary document image of FIG. 2 in accordance with an aspect of the present invention. The first merged region 310 includes the circular region 230 and a portion of the second region 230. FIG. 4 illustrates a mask associated with the exemplary document image of FIG. 2 in accordance with an aspect of the present invention. Within the first merged region 310, the circular region 230 is represented in the background while the remainder of the first merged region 310 including the portion of the second region 230 is represented in the foreground. However, within the second merged region 320, the first region 210 is represented in the foreground and the second region 230 is represented in the background. Thus, a spurious boundary exists dividing the second region 220 (e.g., second region 220 is in the foreground of first merged region 310 and in the background of the second merged region 320).

The foreground and the background comprise care pixels and don't care pixels. Identification of care pixels and don't care pixels being based, at least in part, upon the binary mask. "Care pixel(s)" refers to pixel(s) of the image input alteration of which would compromise the integrity of the reconstructed image (e.g., reconstruction performed by an image decoder (not shown). For example, referring to FIG. 4, the circular region 230 comprises care pixels in the foreground; however, the circular region 230 comprises don't care pixels in the background.

The division of the second region 230 at the boundary between the first merged region 310 and the second merged region 320 can result in an observable artifact (e.g., based on a spurious boundary). Similarly, the division of the second region 230 at the boundary between the first merged region 310 and the third merged region 320 can result in an observable artifact. The artifact(s) can be based, at least in part, upon quantization occurring within an encoder (not shown), for example. In accordance with an aspect of the present invention, the image retoucher 100 is adapted to detect the spurious boundary and extend the foreground and/or background of the regions near the spurious boundary. Accordingly, the effect of the spurious boundary/artifact can be significantly reduced.

Figure 5:
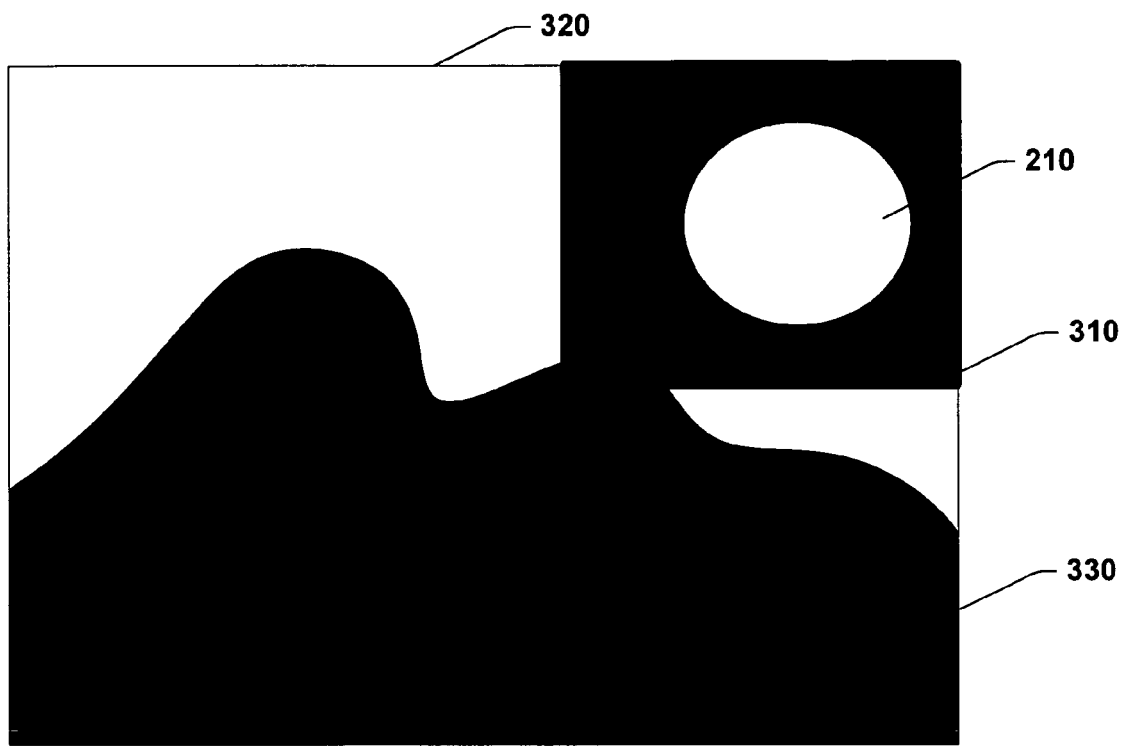
FIG. 5 depicts an extended foreground of a region associated with the binary mask of FIG. 4.

Referring to FIG. 5 the foreground (e.g., represented by black pixels) has been extended (e.g., by five pixels) to reduce the effect of the spurious boundary. Similarly, in FIG. 6, the background (e.g., represented by gray-hatched areas) has been extended (e.g., by five pixels) to reduce the effect of the spurious boundary.

Figure 6:
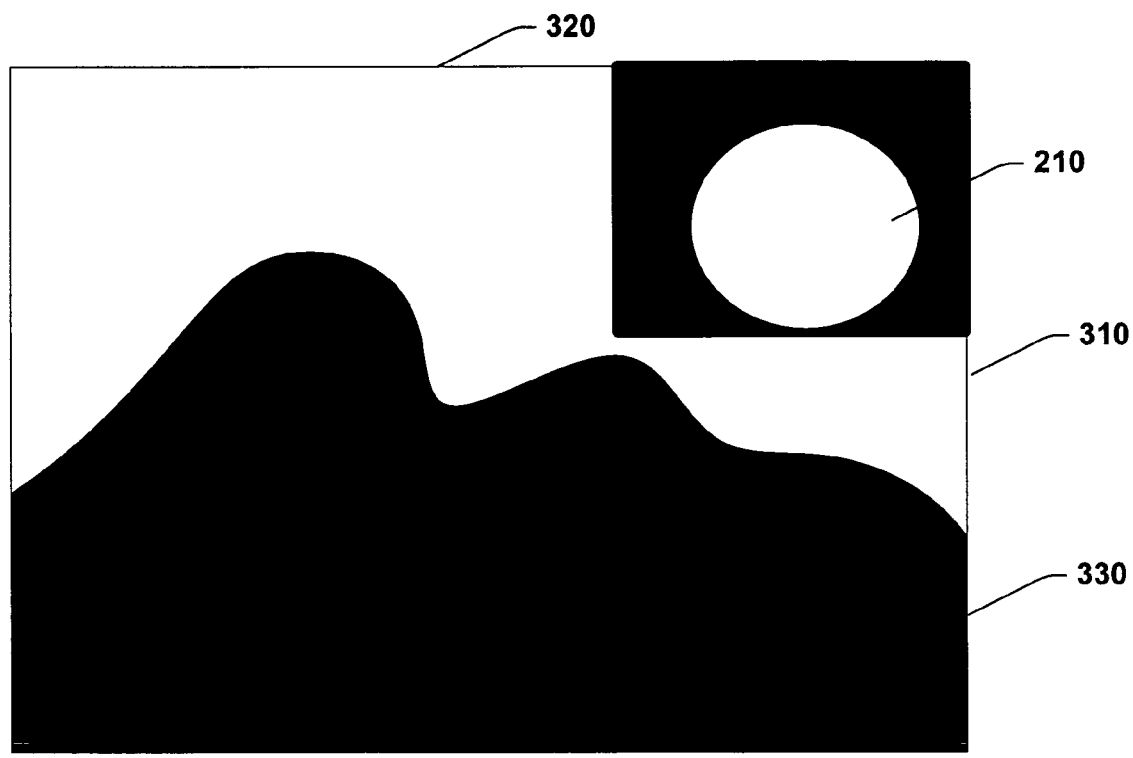
FIG. 6 depicts an extended background of a region associated with the binary mask of FIG. 4.

It is to be appreciated that the exemplary image of FIG. 2, merged regions of FIG. 3, binary mask of FIG. 4, extended foreground of FIG. 5 and extended background of FIG. 6 are presented for purposes of illustration and are not intended to limit the scope of the present invention.

Turning back to FIG. 1, the boundary detector 110 is adapted to detect a spurious boundary in a document image comprising a foreground and a background. The boundary detector 110 can utilize information stored in the binary mask in order to detect the spurious boundary. For example, detection can be performed by identifying horizontal and/or vertical line(s) of a merged region boundary that are longer than a first threshold quantity of pixel(s) (e.g., five pixels) for which: (1) one side of the boundary is foreground and the other side background, and (2) linear regression along that line on either side differs by more than a second threshold amount (e.g., linear regression can be performed on the boundary pixels of the foreground side of the pixels and linear regression performed for the pixels of the background side of the pixels). A constant regression (e.g., the average of the pixel immediately against the boundary on one side) can also be used.

Once a spurious boundary has been detected by the boundary detector 110, the image extender 120 is adapted to extend care pixels of the foreground on the side of the boundary line that is foreground and/or the background on the side of the boundary line that is background near the spurious boundary, for example, by alteration of the binary mask for compression the foreground and/or background, for example, by N pixel(s) of the foreground and/or M pixel(s) of the background, N and M being integers greater to or equal to one. For example, by extending the care pixels of the foreground and the background, the quantization effect on both sides of the spurious boundary can be minimized thus significantly decreasing the observable effect of an artifact resulting from quantization. The binary mask itself is not changed; the changes noted are used for compression of the foreground and/or background.

While FIG. 1 is a block diagram illustrating components for the image retoucher 100, it is to be appreciated that the image retoucher 100, the boundary detector 110 and/or the image extender 120 can be implemented as one or more computer components, as that term is defined herein. Thus, it is to be appreciated that computer executable components operable to implement the image retoucher 100, the boundary detector 110 and/or the image extender 120 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 7:
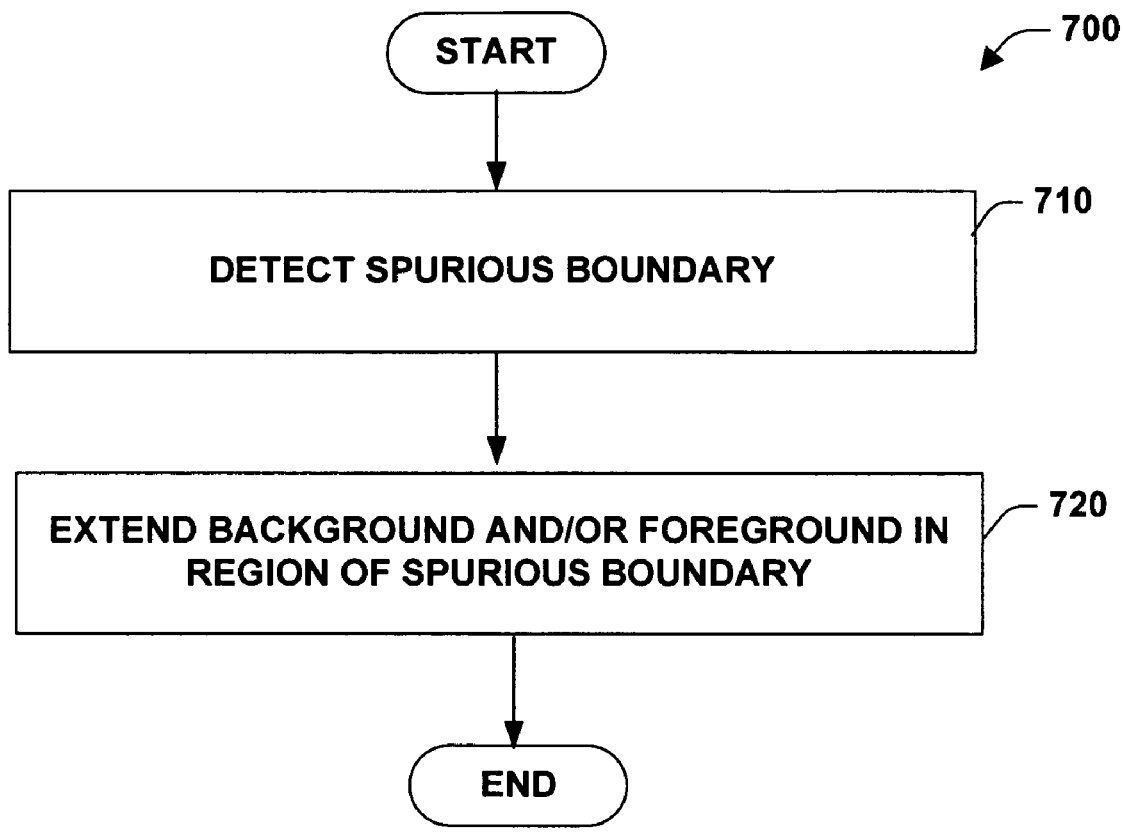
FIG. 7 is a flow chart illustrating a methodology for retouching an image in accordance with an aspect of the present invention.
Figure 8:
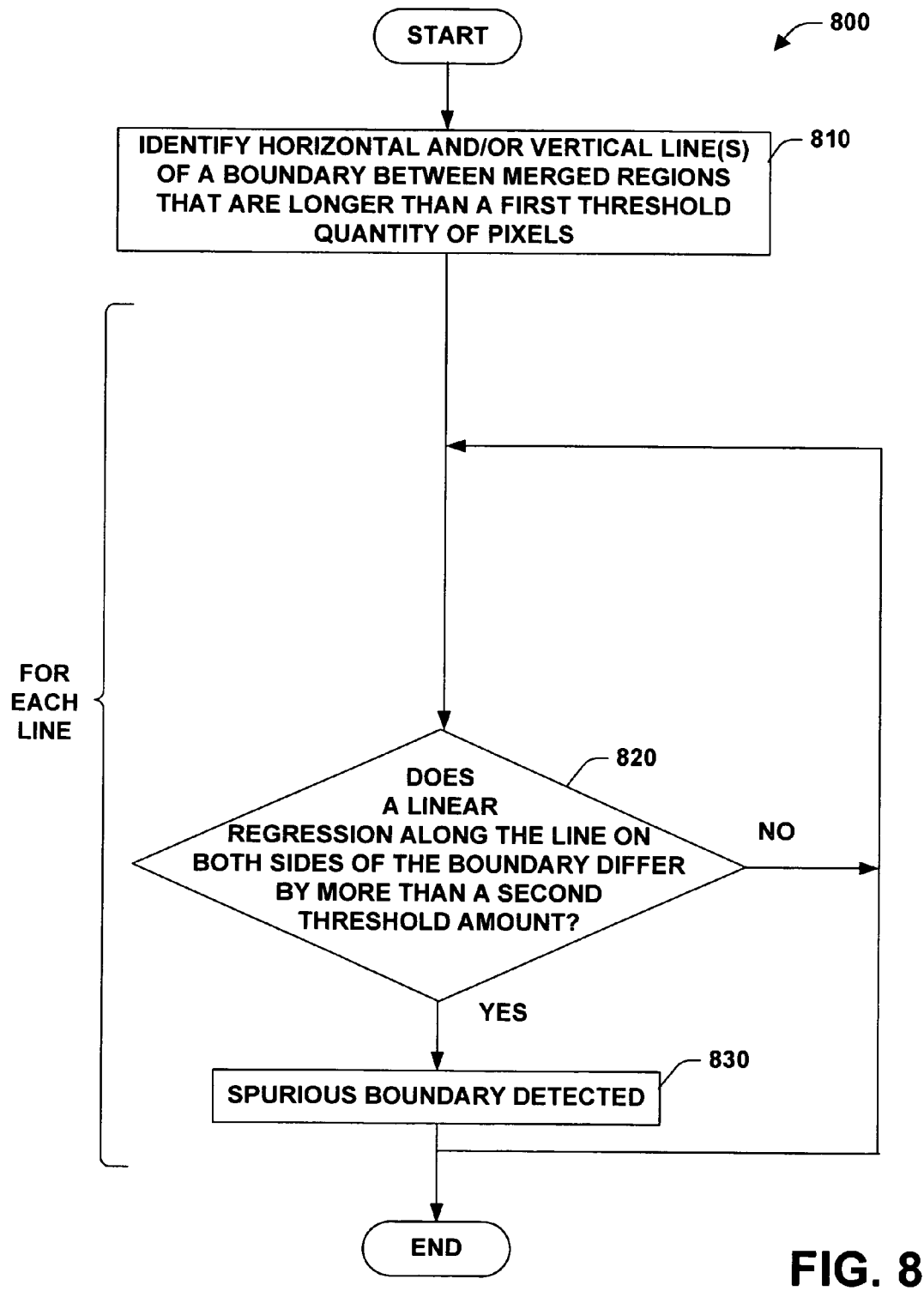
FIG. 8 is a flow chart illustrating a methodology for detecting a spurious boundary in accordance with an aspect of the present invention.

In view of the exemplary systems shown and described above, methodologies that may be implemented in accordance with the present invention will be better appreciated with reference to the flow charts of FIGS. 7 and 8. While, for purposes of simplicity of explanation, the methodologies is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 7, a methodology 700 for retouching an image in accordance with an aspect of the present invention is illustrated. At 710, a spurious boundary is detected (e.g., utilizing information stored in a binary mask). For example, detection can be performed by identifying horizontal and/or vertical line(s) of a boundary between merged regions that is longer than a first threshold quantity of pixel(s) (e.g., five pixels) for which: (1) one side of the boundary is foreground and the other side background, and (2) linear regression along that line on either side differs by more than a second threshold amount (e.g., linear regression can be performed on the boundary pixels of the foreground side of the boundary and linear regression performed for the pixels of the background side of the boundary). Alternatively, a constant regression can also be done. At 720, the background of the side of the boundary that is background and/or the foreground of the side of the boundary that is foreground is extended in the region of the spurious boundary.

Referring next to FIG. 8, a methodology 800 for detecting a spurious boundary in accordance with an aspect of the present invention is illustrated. At 610, horizontal and/or vertical boundaries that are longer than a first threshold quantity of pixels are identified. At 820, a determination is made whether a linear regression along the line on both sides of the line differ by more than a second threshold amount. If the determination at 820 is NO, no further processing occurs with respect to that particular line. If the determination at 820 is YES, at 830, a spurious boundary is detected.

Figure 9:
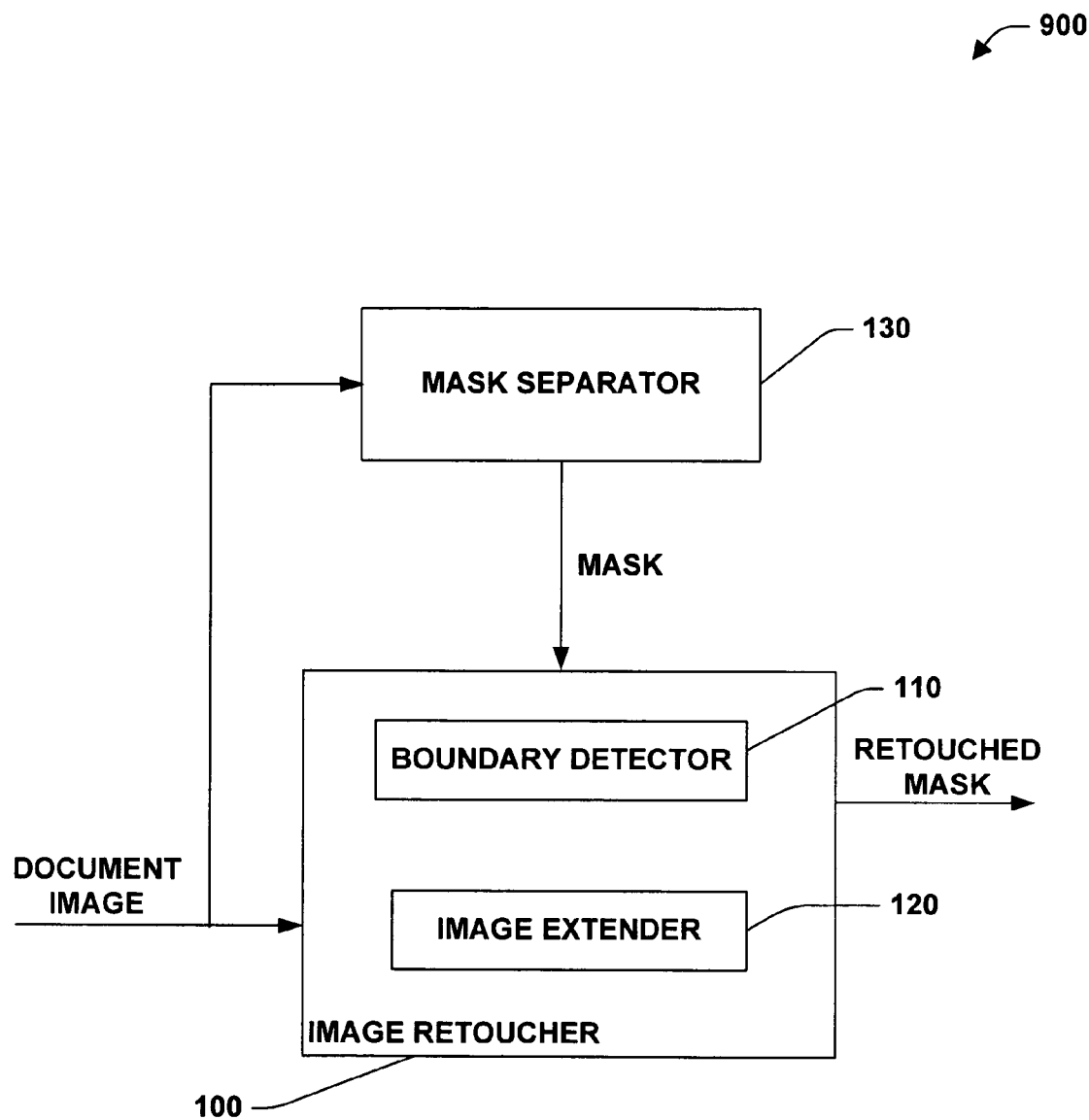
FIG. 9 is a block diagram of a segmented layered image system in accordance with an aspect of the present invention.

Turning next to FIG. 9, a segmented layered image system 900 in accordance with an aspect of the present invention is illustrated. The segmented layered image system 900 includes an image retoucher 100 having a boundary detector 110 and an image extender 120. The segmented layered image system 900 further includes a mask separator 130.

The mask separator 130 receives a document image (e.g., based on a document to be archived and/or transmitted). For example, the segmented layered image system 900 can be part of a document compression system (not shown). The document image can be a binary, RGB and/or YUV representation of document(s). The mask separator component 130 processes the document image and outputs a mask (e.g., binary) indicating whether each pixel of the document image belongs in the foreground and/or background. The mask can then be utilized by the image retoucher 100. It is to be appreciated that the mask separator component 130 can be a computer component as that term is defined herein.

It is to be appreciated that the system and/or method of the present invention can be utilized in an overall segmented layered image system facilitating identification and/or compression of text, handwriting, drawings and the like. Further, those skilled in the art will recognize that the system and/or method of the present invention can be employed in a vast array of document image applications, including, but not limited to, photocopiers, document scanners, optical character recognition systems, PDAs, fax machines, digital cameras and/or digital video cameras.

Figure 10:
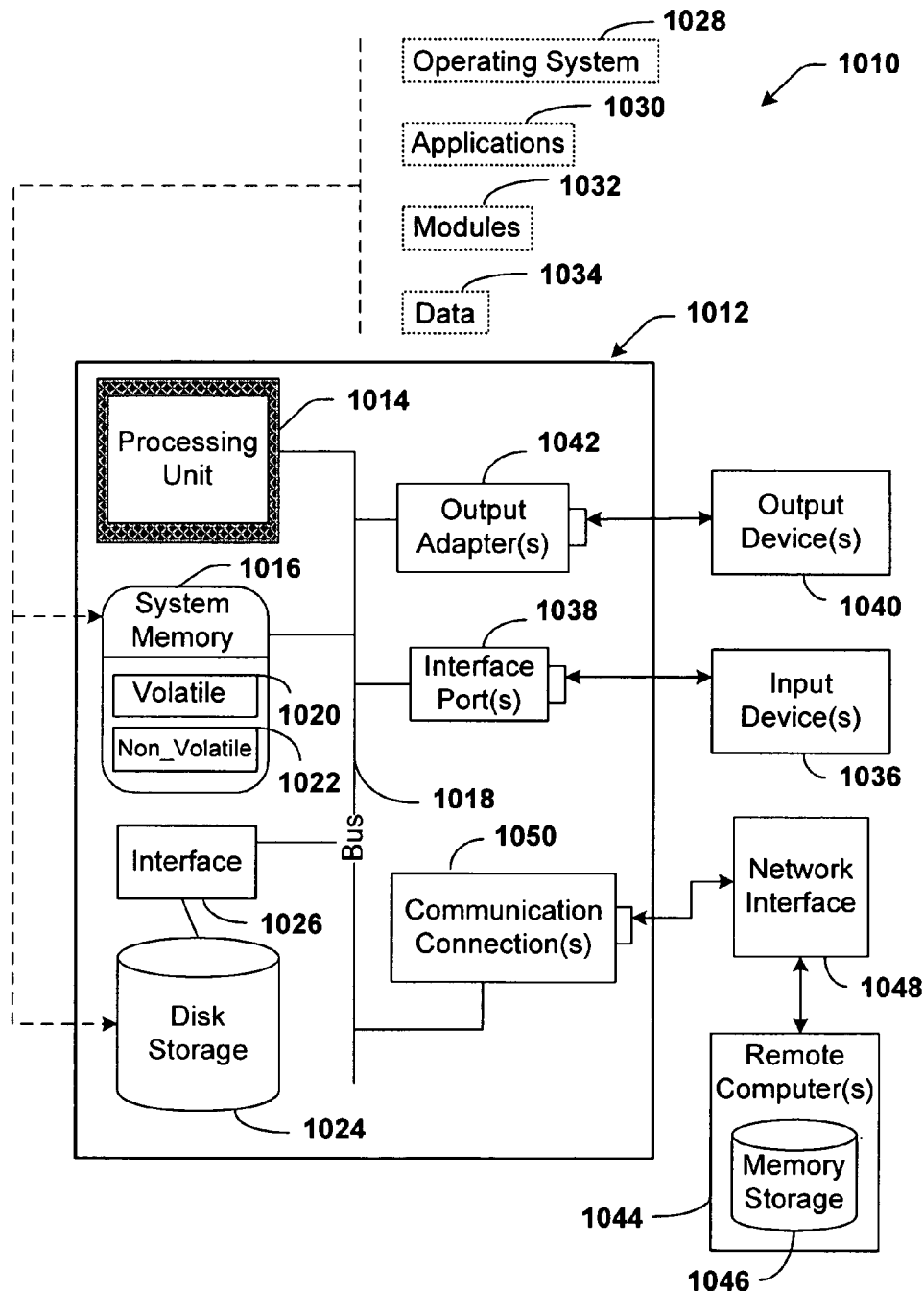
FIG. 10 illustrates an example operating environment in which the present invention may function.

In order to provide additional context for various aspects of the present invention, FIG. 10 and the following discussion are intended to provide a brief, general description of a suitable operating environment 1010 in which various aspects of the present invention may be implemented. FIG. 12 provides an additional and/or alternative operating environment in which the present invention can operate. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 10-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jazz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the possessing unit 1016 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1002.3, Token Ring/IEEE 1002.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
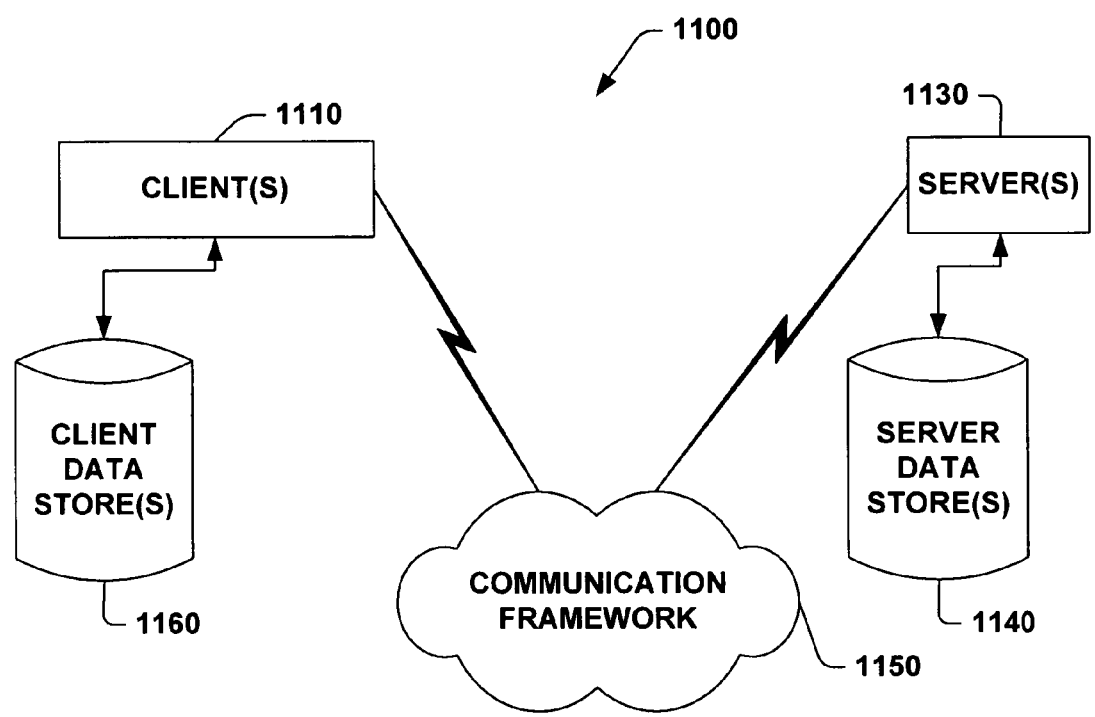
FIG. 11 is a schematic block diagram of an exemplary communication environment in accordance with the present invention.

FIG. 11 is a schematic block diagram of a sample computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The server(s) 1130 can house threads to perform transformations by employing the present invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the server(s) 1130.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A document compression system, comprising:
   an encoder that compresses at least one of a foreground and a background of a document image;
   a mask separator that processes the document image and outputs a binary mask, the binary mask assigns pixels of the document image into at least one of the foreground and the background;
   an image retoucher comprising a boundary detector that detects a spurious boundary in the document image comprising the foreground and the background, detection being based, at least in part, upon pixel assignment information stored in the binary mask, the image retoucher further comprising an image extender that extends care pixels of at least one of the foreground and the background near the spurious boundary, extension of the care pixels being used for compression of at least one of the foreground and the background; and
   a decoder that un-compresses at least one of the foreground and the background of the document image.

2. The system of claim 1, the boundary detector detects the spurious boundary by identifying a horizontal or vertical boundary line between merged regions that is longer than a first threshold quantity of pixels for which one side of the boundary line is foreground and the other side of the boundary is background.

3. The system of claim 2, the boundary detector further performs a linear regression along the boundary line, the spurious boundary being detected if the linear regression on either side differs by more than a second threshold amount.

4. The system of claim 3, extension of the care pixels being based upon extending care pixels near the spurious boundary of the foreground on the side of the spurious boundary that is foreground and extending care pixels near the spurious boundary of the background on the side of the spurious boundary that is background.

5. The system of claim 2, the boundary detector further performs a constant regression along the boundary line, wherein the average of the care pixels immediately against the boundary line determines the spurious boundary.

6. The system of claim 2, the boundary detector further compares the average of the foreground along the boundary line with the average of the background on the other side of the boundary, the spurious boundary being detected if the averages differ by more than a second threshold amount.

7. The system of claim 1, the binary mask being based, at least in part, upon a partition of the document image based, at least in part, upon minimization of pixel energy of at least one of the foreground and the background.

8. A method for facilitating document compression of an image, comprising:
   compressing at least one of a foreground and a background of a document image;
   processing the document image and outputting a binary mask;
   assigning pixels of the document image into at least one of the foreground and the background;
   detecting a spurious boundary in the document image comprising the foreground and the background, detection being based, at least in part, upon pixel assignment information;
   extending care pixels of at least one of the foreground and the background near the spurious boundary, extension of the care pixels being used for compressing at least one of the foreground and the background; and
   un-compressing at least one of the foreground and the background of the document image.

9. The method of claim 8, detection of the spurious boundary being based, at least in part, upon identification of a horizontal or vertical boundary line between merged regions that is longer than a first threshold quantity of pixels for which one side of the boundary line is foreground and the other side of the boundary is background.

10. The method of claim 9, detection of the spurious boundary being based, at least in part, upon a linear regression along the boundary line, the spurious boundary being detected if the linear regression on either side differs by more than a second threshold amount.

11. The method of claim 9, detection of the spurious boundary being based, at least in part, upon a constant regression along the boundary line, the spurious boundary being detected based on an average of the care pixels immediately against the boundary line.

12. The method of claim 9, detection of the spurious boundary being based, at least in part, upon an average of the foreground along the boundary line with an average of the background on the other side of the boundary, the spurious boundary being detected if the averages differ by more than a second threshold amount.

13. The method of claim 8, further comprising reconstructing the document image using the binary mask, the binary mask is used to determine which pixels came from the foreground and which pixels came from the background; and altering information stored in the binary mask to reduce compression errors near the spurious boundary while keeping the binary mask the same.

14. An image retoucher, comprising:
   a boundary detector that detects a spurious boundary in a document image comprising a foreground and a background, detection being based, at least in part, upon identifying a horizontal or vertical boundary line between merged regions that is longer than a first threshold quantity of pixels for which one side of the boundary line is foreground and the other side of the boundary is background, the boundary detector further performs a linear regression along the boundary line, the spurious boundary being detected if the linear regression on either side differs by more than a second threshold amount; and
   an image extender that extends care pixels of at least one of the foreground and the background near the spurious boundary, extension of the care pixels being used for compression of at least one of the foreground and the background.

15. The image retoucher of claim 14, extension of the care pixels being based upon extending care pixels near the spurious boundary of the foreground on the side of the spurious boundary that is foreground and extending care pixels near the spurious boundary of the background on the side of the spurious boundary that is background.

16. The image retoucher of claim 14, the boundary detector further performs a constant regression along the boundary line, wherein the average of the care pixels immediately against the boundary line determines the spurious boundary.

17. The image retoucher of claim 14, the boundary detector further compares the average of the foreground along the boundary line with the average of the background on the other side of the boundary, the spurious boundary being detected if the averages differ by more than a second threshold amount.

18. The image retoucher of claim 14, wherein the boundary detector reconstructs the document image using a binary mask, the binary mask is used to determine which pixels came from the foreground and which pixels came from the background.

19. The image retoucher of claim 18, wherein the boundary detector alters care pixels of at least one of the foreground and the background stored in the binary mask to reduce compression errors near the spurious boundary while keeping the binary mask the same.

20. The image retoucher of claim 18, the binary mask being based, at least in part, upon a partition of the document image based, at least in part, upon minimization of pixel energy of at least one of the foreground and the background.

* * * * *